United States Patent Office 3,437,522
Patented Apr. 8, 1969

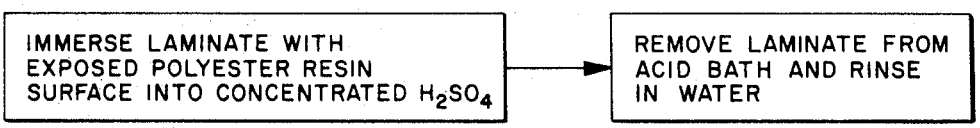
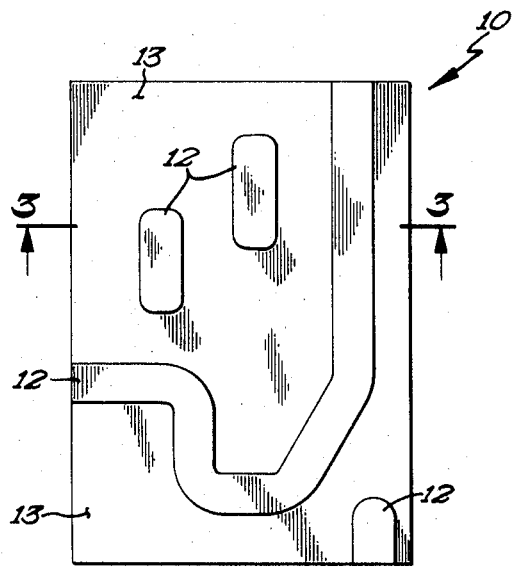

3,437,522
PROCESS FOR REMOVING ADHESIVES FROM POLYOLEFIN FILM BY IMMERSION IN SULFURIC ACID
Herbert J. Fick, Northfield, and Roger W. Johnson, St. Paul, Minn., assignors to G. T. Schjeldahl Company, Northfield, Minn., a corporation of Minnesota
Filed Feb. 19, 1965, Ser. No. 442,844
Int. Cl. B08b 3/08
U.S. Cl. 134—38      4 Claims

ABSTRACT OF THE DISCLOSURE

A technique for removing adhesives from polyolefin films, the adhesive being employed to bond a conductor utilizing printed circuitry onto the polyolefin film. Removal of the adhesive is desirable since the adhesive has different electrical properties than the polyolefin films, and it has been found that the adhesive is generally more hygroscopic than the polyolefin film. The adhesive is removed by immersing the film into a concentrated sulfuric acid solution and subsequently rinsing the treated film in water.

---

The present invention relates generally to a process for removing adhesives from polyolefin films, and more particularly to the removal of an adherent layer or film of adhesive from the surface of a polyolefin film, the adhesive consisting essentially of a polyester base resin. The invention described herein was made in the performance of work under a NASA contract and is subject to the provisions of the National Aeronautics and Space Act of 1958, Public Law 85–568 (72 Stat. 426; 42 U.S.C. 2451), as amended.

In the application of plastic film to metal foil to form laminate structures, it is frequently desirable to remove the adhesive which may remain on surface portions of the plastic film where metal foil has been removed or is not present. This is especially true and desirable in printed circuitry inasmuch as any adhesive which may remain in contact with the conductive metal foil may have different electrical characteristics which are different from those of the substrate, the adhesive being generally more electrically conductive. Polyester adhesives are generally polar structures and accordingly have substantially different electrical characteristics than polyolefins. Furthermore, the adhesive is generally substantially more hygroscopic than the polyolefin base material, and this characteristic may, in certain environments, generally upset the electrical stability of a circuit which has been formed. In certain other applications, it may be desirable to remove the adherent polyester film in order to reduce solar absorption particularly if the material is to be used in either outdoor or aerospace applications. In certain other environments, weight may present a critical problem and any reduction possible by removal of excess adhesive is, of course, generally desirable.

In accordance with the present invention, a technique is devised for removing polyester base adhesive layers or adherent films from the surface of polyolefin bodies. The procedure may also be applicable to cleaning other adhesives systems from other polymers. Briefly, the method includes the step of immersing the material to be stripped of its adherent polyester layer or film into sulfuric acid with an acid concentration of 93 percent or more, the treatment being carried out at room temperature for a sufficiently long interval of time to attack the polyester, and thereafter removing the material from the acid and rinsing with water. The final rinse step removes the acid from the material, and also washes away the adhesive residue. This procedure is effective in completely removing the adhesive from the surface of the polyolefin body. If desired in order to expedite the operation, it may be necessary to heat the acid to an elevated temperature, this procedure being appropriate under environmental conditions which are otherwise not detrimental to the material and object being treated.

Therefore, it is an object of the present invention to provide an improved technique for removing adhesive layers or films from the surface of polyolefin bodies, wherein the adhesive is comprised of a polyester base resin.

It is a further object of the present invention to provide an improved technique for removal of polyester base resin adhesives from the surface of a polyolefin film, the technique comprising immersing the material in a bath of concentrated sulfuric acid.

It is yet a further object of the present invention to provide an improved technique for removing polyester base resin adhesives from the surface of metal-polyolefin film laminates, the method consisting essentially of immersing the laminate into a bath of concentrated sulfuric acid until the polyester film has been stripped from the surface.

Other and further objects of the present invention will become apparent to those skilled in the art upon a study of the following specification, appended claims, and accompanying drawing, wherein:

FIGURE 1 is a flow diagram showing the steps carried out in connection with the technique of the present invention;

FIGURE 2 is a top plan view of a metal-plastic laminate structure, the laminate having exposed areas of polyester base resin thereon; and FIGURE 3 is a vertical sectional view taken along the line and in the direction of the arrows 3—3 of FIGURE 2.

In accordance with the preferred modification of the present invention, a polyolefin film selected from the group consisting of polyethylene, polypropylene, polytetrachloroethylene, polyvinylfluoride, and polyvinylchloride are used to form a substrate for application of a metal foil thereto. The metals which are substantially unaffected by exposure to concentrated sulfuric acid for short durations at substantially room temperature are those sulfuric acid resistant metals selected from the group consisting of lead, copper, aluminum, titanium, nickel, chromium, cobalt, tin, beryllium, zinc, silver, gold, platinum, stainless steel, and alloys thereof. The adhesive which may be utilized to bond material to the polyolefin film, such as these metals or the like, is selected from the group consisting of the reaction product of a dibasic acid with a diol. For example, mixtures of aromatic and aliphatic dibasic acids such as a 50:50 molar mixture of phthalic acid and either adipic or sebacic acid together with an equimolar portion of ethylene glycol are commercially available and may be utilized in the environment of the present invention. In lieu of ethylene gycol, heptane diol or pentane diol may be employed.

Generally, the polyester constitutes a low molecular weight substance with a low acid number, and is prepared from glycols of from 2 to 6 carbon atoms, terephthalic acid, isophthalic acid, and acyclic dicarboxylic acids with a linear chain of 6 to 12 carbon atoms. These reaction products are gummy solids of white to gray color with molecular weights of not over about 10,000. Polyester base resin adhesives of this type are also readily commerically available. It has been determined that the linkage which is susceptible to attack by concentrated sulfuric acid at room temperature is the ester linkage identified as follows:

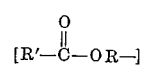

where R and R' are hydrocarbon radicals making up the polyester copolymer, and wherein the composite unit shown is the repeating unit of the reaction product.

In the preparation of printed circuits and the like, a metal foil such as copper, for example, is normally bonded to a substrate member such as a polyolefin film material selected from the group presented hereinabove. With reference to the drawing, particularly FIGURES 2 and 3, there is illustrated a printed wiring assembly or member generally designated 10 which includes a polyethylene base or substrate element 11 and a metal 12 secured to the upper surface thereof. An adhesive bond or film 13 with the adhesive being of the type disclosed hereinabove is disposed as a foil on the surface of the polyolefin material in a predetermined pattern based upon the specific requirements of the circuitry application. As is conventional in the art, the metal foil is initially bonded over substantially the entire surface of the substrate, and thereafter the metal is coated with a layer or film of a photosensitive or other acid resist material. After preparing a desired geometric pattern on the resist, certain specific areas of the metal foil, such as copper, are etched away from the surface of the substrate 11, leaving the adhesive layer 13 exposed thereover. Such a structure is shown in FIGURE 2 of the drawing, this structure including the circuitry lines 12—12 which are disposed on the surface of the substrate.

Because of the anomalous electrical characteristics which may develop due to the presence of the polyester adhesive on the surface of the polyolefin film in contact with the metal foil, the laminate structure is treated to remove the polyester after the circuitry pattern has been prepared. The assembly is immersed in a concentrated solution of sulfuric acid in order to accomplish this result, the acid being at room temperature, with a concentration of 93 percent or more. Thereafter, the laminate is removed from the acid bath and rinsed in water in order to remove any trace of residual acid therefrom. If desired, other conventional rinsing techniques may be employed. This exposure to concentrated sulfuric acid at room temperature destroys the structure of the polyester base resin, and the residuals are physically removed from the surface of the polyolefin film by the rinsing operation.

In various operations and applications, the techniques of the present invention have been found to be effective in removing polyester base adhesives. Examples of these procedures are as follows:

EXAMPLE I

Aluminum foil was removed from a lamination of aluminum foil and polypropylene with a caustic etchant. This left a polypropylene film coated with a thin layer of polyester adhesive which altered its spectral absorption. The adhesive layer which was less than .0001 inch thick was readily displayed by infrared absorptivity measurements. These specimens were then dipped in concentrated sulfuric acid at room temperature, rinsed free of the acid and the adhesive residue, and then dried. The film cleaned in this manner could not be differentiated from virgin film by infrared techniques.

EXAMPLE II

A lamination of polypropylene and copper foil had a printed circuit test pattern etched in the copper and formed thereon in which about 50 percent of the copper foil was removed. The opaque adhesive remaining in the etched portions of the specimen which were about 0.25 mil in thickness were removed by a one-minute dip in concentrated sulfuric acid at room temperature followed by a water rinse. The thin white adhesive coat lying loose on the specimen was then easily wiped free, leaving the clear polypropylene film in the etched areas. This adhesive was a reaction product of a 50:50 molar mixture of phthalic acid and adipic acid together with an equimolar portion of ethylene glycol. There was no apparent damage to the bond between the remaining copper and polypropylene film. Excellent electrical properties under high humidity conditions were observed for the sample.

EXAMPLE III

A printed circuit test pattern was prepared from a flexible lamination of electrolytic copper (1 oz.) and polypropylene film (3 mils). About 50 percent of the copper area was removed with standard etchants. The polyester adhesive which was about 0.25 mil in thickness in the nonconductor areas was removed by immersing in concentrated $H_2SO_4$ for 1.5 minutes at room temperature. The acid and adhesive residue was removed by light scrubbing with a water rinse. There was no apparent damage to the film, the copper foil, or to the adhesive under the foil. Surface resistivity of the sample under high humidity was essentially that of the polypropylene film, and sensitivity of the residual adhesive to moisture was not evidenced.

EXAMPLE IV

Samples laminations of electrolytic copper (1 oz. and 2 oz.) and Teflon FEP were prepared using polyester adhesives. These samples were treated as in Example II. Excellent retention of the properties of the Teflon were observed.

In each of the examples, the polyester adhesive was of the type shown in Example II. Similar results have been obtained with polyester adhesives having the general composition disclosed hereinabove, such as polyester polymers consisting of 50:50 mixtures of phthalic and sebacic acids together with heptane diol. Pentane diol may be substituted for the heptane diol if desired. Accordingly it is the linkage defined by the ester linkage which is believed attacked by the concentrated sulfuric acid. Because of the unique ability of the polyolefin films to withstand exposure to concentrated sulfuric acid at these temperatures and conditions, and because of the ability of various metals including copper, aluminum, and the like, to withstand exposure to concentrated sulfuric acid, the technique has been found to be extremely desirable in certain aerospace applications where anomalous absorption of solar radiation would be disturbing upon the material as it moves through a space environment. Such anomalous infrared absorption will definitely occur when traces of polyester resins are permitted to remain on the surface of these objects.

It will be appreciated that various modifications of the present technique may be developed by those skilled in the art without departing from the spirit and scope of the present invention, and it will be understood that there is no intention of limiting the scope of the invention to the specific examples provided herein.

What is claimed is:
1. The method of removing adherent films of polyester base resin selected from the group consisting of the reaction product of a glycol containing from 2 to 6 carbon atoms and a dibasic acid with from 6 to 12 carbon atoms from a surface of a laminate structure comprising a polyolefin film substrate and a overlying metal foil, the metal foil being selected from the group of acid resist metals consisting of lead, copper, aluminum, titanium, nickel, chromium, cobalt, tin, beryllium, zinc, silver, gold platinum, stainless steel, and alloys thereof, the metal foil covering a portion only of the surface of said substrate with said adherent film of polyester base resin covering the remaining portion of said substrate surface, said method comprising the steps of immersing said laminate in a concentrated solution of sulfuric acid, and thereafter rinsing the surface of said laminate in water to remove the residual sulfuric acid therefrom.

2. The method as set forth in claim 1 being particularly characterized in that said metal is copper.

3. The method as set forth in claim 2 being particularly characterized in that said polyolefin is selected from the group consisting of polyethylene, polypropylene, and polytetrafluoroethylene.

4. The method as defined in claim 1 being particularly characterized in that said solution of sulfuric acid contains more than 93 percent hydrogen sulphate.

References Cited

UNITED STATES PATENTS

| | | | |
|---|---|---|---|
| 3,275,486 | 9/1966 | Schroeder | 134—38 XR |
| 3,282,765 | 11/1966 | Pine et al. | 134—38 |
| 3,305,416 | 2/1967 | Kahan et al. | 156—3 |
| 3,331,718 | 7/1967 | Ruffing | 134—38 |
| 3,352,730 | 11/1967 | Murch | 156—3 |

WILBUR L. BASCOMB, JR., *Primary Examiner.*

U.S. Cl. X.R.

117—8; 134—3; 156—3; 174—68.5